United States Patent
Lee et al.

(10) Patent No.: US 6,833,881 B2
(45) Date of Patent: *Dec. 21, 2004

(54) LIQUID CRYSTAL DISPLAY DEVICE AND METHOD OF MANUFACTURING THEREOF

(75) Inventors: Jae Kyun Lee, Anyang-shi (KR); Chang Wook Han, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/277,815

(22) Filed: Oct. 23, 2002

(65) Prior Publication Data

US 2003/0090613 A1 May 15, 2003

Related U.S. Application Data

(63) Continuation of application No. 09/348,704, filed on Jul. 7, 1999, now Pat. No. 6,509,939.

(30) Foreign Application Priority Data

Jul. 7, 1998 (KR) ........................ 1998-27249

(51) Int. Cl.⁷ .......................................... G02F 1/1368
(52) U.S. Cl. .................... 349/39; 349/43; 349/110; 349/139; 349/141; 349/187; 438/30
(58) Field of Search ................ 349/38, 39, 43, 349/139, 141, 149, 152, 187, 110; 257/59, 72, 57; 438/30

(56) References Cited

U.S. PATENT DOCUMENTS

| | | | | |
|---|---|---|---|---|
| 4,239,346 A | | 12/1980 | Lloyd | 350/334 |
| 4,412,900 A | * | 11/1983 | Tanaka et al. | 204/192.26 |
| 4,726,659 A | | 2/1988 | Conrad et al. | 350/341 |

(List continued on next page.)

FOREIGN PATENT DOCUMENTS

| | | |
|---|---|---|
| EP | 0 368 260 | 5/1990 |
| EP | 0 588 568 | 9/1993 |
| EP | 0 749 029 | 12/1996 |
| JP | 60-158421 | 8/1985 |
| JP | 62-078532 | 4/1987 |
| JP | 04-067127 | 3/1992 |
| JP | 06-160878 | 6/1994 |
| JP | 06-273803 | 9/1994 |
| JP | 07-036058 | 2/1995 |
| JP | 07-134301 | 5/1995 |
| JP | 07-225388 | 8/1995 |
| JP | 08-062586 | 3/1996 |

(List continued on next page.)

OTHER PUBLICATIONS

S. Matsumoto, Display Characteristics of In–Plane Switching (IPS) LCDs and a Wide–Viewing–Angle 14.5–in. IPS TFT–LCD; Euro Display '96, pp. 445–448.

(List continued on next page.)

*Primary Examiner*—Toan Ton
*Assistant Examiner*—Tai Duong
(74) *Attorney, Agent, or Firm*—McKenna Long & Aldridge LLP

(57) ABSTRACT

A liquid crystal display device according to the present invention comprises first and second substrates, a gate bus line and a transparent data bus line defining unit pixel region, a common line parallel to a gate bus line in the pixel region, a TFT at a crossing of a data bus line and the gate bus lines in the pixel region, a common electrode and a storage capacitor line in the pixel region, a gate insulator having holes on the gate bus line, the common electrode, and the storage capacitor lines, a passivation layer having holes on the gate insulator, a first alignment layer with a fixed alignment direction on the passivation layer, and a liquid crystal layer between the first and second substrates.

21 Claims, 8 Drawing Sheets

U.S. PATENT DOCUMENTS

| | | | |
|---|---|---|---|
| 5,307,189 A | 4/1994 | Nishiki et al. | 359/59 |
| 5,321,535 A | 6/1994 | Ukai et al. | 359/55 |
| 5,459,596 A | 10/1995 | Ueda et al. | 359/59 |
| 5,464,669 A | 11/1995 | Kang et al. | 428/1 |
| 5,492,762 A | 2/1996 | Hirai et al. | 428/447 |
| 5,576,858 A | 11/1996 | Ukai et al. | 359/59 |
| 5,579,135 A * | 11/1996 | Kajiyama et al. | 349/89 |
| 5,598,285 A | 1/1997 | Kondo et al. | 349/39 |
| 5,600,464 A | 2/1997 | Ohe et al. | 349/123 |
| 5,602,662 A | 2/1997 | Rosenblatt et al. | 349/130 |
| 5,608,556 A | 3/1997 | Koma | 349/143 |
| 5,646,705 A | 7/1997 | Higuchi et al. | 349/143 |
| 5,648,674 A | 7/1997 | Weisfield et al. | |
| 5,686,019 A | 11/1997 | Nakamura | 252/299.01 |
| 5,737,051 A | 4/1998 | Kondo et al. | 349/141 |
| 5,742,369 A | 4/1998 | Mihara et al. | 349/123 |
| 5,745,207 A | 4/1998 | Asada et al. | 349/141 |
| 5,757,455 A | 5/1998 | Sugiyama et al. | 349/129 |
| 5,760,856 A | 6/1998 | Yanagawa et al. | 349/42 |
| 5,760,857 A | 6/1998 | Yanagawa et al. | 349/43 |
| 5,786,876 A | 7/1998 | Ota et al. | 349/42 |
| 5,793,459 A | 8/1998 | Toko | 349/128 |
| 5,818,560 A | 10/1998 | Kouno et al. | |
| 5,831,701 A | 11/1998 | Matsuyama et al. | 349/110 |
| 5,841,499 A | 11/1998 | Baur et al. | 349/141 |
| 5,852,485 A | 12/1998 | Shimada et al. | 349/141 |
| 5,859,682 A | 1/1999 | Kim et al. | 349/124 |
| 5,870,160 A | 2/1999 | Yanagawa et al. | 349/141 |
| 5,886,762 A | 3/1999 | Lee et al. | 349/141 |
| 5,907,380 A | 5/1999 | Lien | 349/141 |
| 5,910,271 A | 6/1999 | Ohe et al. | 252/299.01 |
| 5,914,762 A | 6/1999 | Lee et al. | 349/141 |
| 5,946,067 A | 8/1999 | Kim et al. | 349/141 |
| 5,956,111 A | 9/1999 | Ohta et al. | 349/141 |
| 5,959,708 A | 9/1999 | Lee et al. | 349/143 |
| 5,969,782 A | 10/1999 | Lee et al. | 349/141 |
| 5,977,562 A | 11/1999 | Hirakata et al. | 257/72 |
| 5,995,186 A | 11/1999 | Hiroshi | 349/141 |
| 6,005,650 A | 12/1999 | Kim et al. | 349/130 |
| 6,040,887 A | 3/2000 | Matsuyama et al. | 349/141 |
| 6,091,473 A | 7/2000 | Hebiguchi | |

FOREIGN PATENT DOCUMENTS

| | | |
|---|---|---|
| JP | 09-005763 | 1/1997 |
| JP | 09-005764 | 1/1997 |
| JP | 09-005793 | 1/1997 |
| JP | 09-033946 | 2/1997 |
| JP | 09-043589 | 2/1997 |
| JP | 09-043590 | 2/1997 |
| JP | 09-101538 | 4/1997 |
| JP | 09-105908 | 4/1997 |
| JP | 09-105918 | 4/1997 |
| JP | 09-258269 | 10/1997 |
| JP | 09-269507 | 10/1997 |
| JP | 09-325346 | 12/1997 |
| KR | 96-32049 | 9/1996 |
| KR | 97-22458 | 5/1997 |
| KR | 98-040330 | 8/1998 |
| KR | 98-083765 | 12/1998 |
| WO | 97-10530 | 3/1997 |

OTHER PUBLICATIONS

M–Oh–e, "Principles and Characteristics of Electro–Optical Behaviour with In–Plane Switching Mode", Asia Display '95, pp. 577–580.

M. Ohta, "Development of Super–TFT–LCDs With In–Plane Switching Display Mode", 1995, Asia Display '95, pp. 707–710.

S. H. Lee, "High–Transmittance, Wide–Viewing–Angle Nematic Liquid Crystal Display Controlled by Fringe–Field Switching", Asia Display '98, pp. 371–374.

R. Kiefer, "In–Plane Switching of Nematic Liquid Crystals", Japan Display '92, pp. 547–550.

U.S. Appl. No. 09/365,634, Hiroshi, filed Aug. 1999.
U.S. Appl. No. 08/880,068, Hiroshi, filed Jun. 1997.
U.S. Appl. No. 09/143,624, Shin et al., filed Aug. 1998.
U.S. Appl. No. 09/079,894, Seo, filed May 1998.
U.S. Appl. No. 09/613,730, Hiroshi, filed Jul. 2000.
U.S. Appl. No. 09/079,895, Oh, filed May 1998.
U.S. Appl. No. 09/348,704, Lee et al., filed Jul. 1999.
U.S. Appl. No. 09/134,405, Ham, filed Aug. 1998.
U.S. Appl. No. 09/149,746, Seo, filed Sep. 1998.
U.S. Appl. No. 09/235,205, Seo et al., filed Jan. 1999.
U.S. Appl. No. 09/271,153, Son et al., filed Mar. 1999.

* cited by examiner

LIQUID CRYSTAL DISPLAY DEVICE AND METHOD OF MANUFACTURING THEREOF

This application is a continuation application of 09/348,704 filed on Jul. 7, 1999 now U.S. Pat. No. 6,509,939, which is hereby incorporated by reference as if fully set forth herein.

This application claims the benefit of Korean Patent Application No. 1998-27249, filed on Jul. 7, 1998, which is hereby incorporated by reference for all purposes as if fully set forth herein.

BACKGROUND OF THE INVENTION

1. Field of Invention

The present invention relates to a liquid crystal display device and, more particularly, to a liquid crystal display device having a high aperture ratio and a method of manufacturing thereof.

2. Discussion of Related Art

Since twisted nematic liquid crystal display devices (TN-LCDs) have a high image quality and a low electric power consumption, they are widely applied to flat panel display devices. TN-LCDs, however, have a narrow viewing angle due to refractive anisotropy of liquid crystal molecules. This is because before voltage is applied, the liquid crystal molecules are horizontally aligned and the liquid crystal molecules become nearly vertically aligned with respect to a substrate when voltage is applied to a liquid crystal panel.

Recently, in-plane switching mode liquid crystal display devices (IPS-LCDs) have been widely studied in which viewing angle characteristic is improved and the liquid crystal molecules are nearly horizontally aligned.

FIG. 1A is a plan view of a unit pixel of a conventional in-plane switching mode active matrix liquid crystal display (AM-LCD). FIG. 1B is a sectional view according to line I–I' of FIG. 1A.

Referring to the drawings, a unit pixel region is defined by a gate bus line 1 and a data bus line 2 in which the lines are arranged perpendicularly and/or horizontally as a matrix shape on a first substrate 10. A common line 16 is arranged parallel to the gate bus line 1 in the pixel region and the thin film transistor (TFT) is formed where the data bus line 2 and the gate bus line 1 cross each other. The TFT includes a gate electrode 3, a gate insulator 19, a semiconductor layer 12, an ohmic contact layer 13, source electrode 4a and drain electrode 4b in which the gate electrode 3 is connected to the gate bus line 1, and source and drain electrodes 4a and 4b are connected to the data bus line 2, and the gate insulator 19 is formed on the entire surface of the first substrate 10.

A common electrode 7 and a data electrode 8 are formed in the pixel region. The common electrode 7 is formed with the gate electrode 3 and connected to the common line 16, and the data electrode 8 is formed with the source and drain electrodes 4a and 4b and electrically connected to them. Further, a passivation layer 22 and a first alignment layer (not illustrated) are deposited on the entire surface of the first substrate 10.

On a second substrate 11, a black matrix 15 is formed to prevent light leakage which may be generated around a TFT, the gate bus line 1, and the data bus line 2. A color filter layer 25 and a second alignment layer (not illustrated) are formed on the black matrix 15 in sequence. Also, a liquid crystal layer 30 is formed between the first and second substrates 10 and 11.

When no voltage is applied to LCD having the above structure, liquid crystal molecules in the liquid crystal layer 30 are aligned according to alignment directions of the first and second alignment layers, but when voltage is applied between the common electrode 7 and the data electrode 8, the liquid crystal molecules are aligned parallel to extending directions of the common and data electrode. As in the foregoing, since liquid crystal molecules in the liquid crystal layer 30 are switched on the same plane at all times, grey inversion is not created in the viewing angle directions of up and down, and right and left directions.

FIG. 2A is a plan view of the part forming the storage capacitor line of the conventional LCD. FIG. 2B is a sectional view according to line II–II' of FIG. 2A.

Referring to the drawings, the gate insulator 19 and the semiconductor layer 12 are deposited on the gate lines 1 and a storage capacitor line 5. The data bus line 2 is coupled to the storage capacitor line 5 through a hole 18 of the gate insulator 19 and formed with the source and drain electrodes 4a and 4b of FIG. 1A. A method for manufacturing the LCD having the above structure is described in FIG. 3.

A TFT region describes a sectional region according to line I–I' of FIG. 1A, and a storage region describes a sectional region according to line II–II' of FIG. 2A.

As shown in the drawing, a method of manufacturing the conventional LCD comprises patterning the gate electrode 3, the common electrode 7, and the storage capacitor line 5 (S1), patterning the semiconductor layer 12 and the ohmic contact layer 13 after forming the gate insulator 19, the semiconductor layer 12, and the ohmic contact layer 13 on the gate electrode 3 (S2), forming the hole 18 by opening some part of the gate insulator 19 in the part forming the storage capacitor line 5 (S3), patterning the source and drain electrodes 4a and 4b, the data electrode 8, and the data bus line 2 on the ohmic contact layer 13 and the gate insulator 19 (S4), forming the passivation layer 22 after n+dry etching (S5).

However, in the conventional LCD, it is necessary that each of the storage capacitor lines and pad open regions are formed respectively, and the storage capacitor lines are coupled to each other by the data bus line when the gate insulator is patterned to form the storage capacitor line.

SUMMARY OF THE INVENTION

Accordingly, the present invention is directed to a liquid crystal display device and method of manufacturing thereof that substantially obviates one or more of the problems due to limitations and disadvantages of the related art.

An advantage of the present invention is to provide a LCD having a high opening ratio due to transparent connecting parts for connecting to an outer driving circuit by etching a passivation layer/pad at the same time thereby forming a storage capacitor line, and a method of manufacturing thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention, as embodied and broadly described, a LCD comprises first and second substrates; transparent data bus lines and gate bus lines defining a pixel region on the first substrate in which the lines are arranged perpendicularly and/or horizontally as a matrix shape, especially the transparent data bus lines made of, for example, ITO (indium tin oxide) has holes; common lines formed parallel to the gate bus lines in the pixel region; TFTs at crossings of the data bus lines and the gate bus lines in the pixel region; common electrodes, data electrodes, and storage capacitor lines in the pixel region; a gate insulator having holes on the gate bus lines, the common electrodes, and the storage capacitor lines; a passivation layer having holes on the gate insulator; a first alignment layer with a fixed alignment direction on the passivation layer; and a liquid crystal layer between the first and second substrates.

In another aspect of the present invention, a method of manufacturing the above LCD comprises forming gate bus lines, gate electrodes, common lines, and storage capacitor lines; depositing an inorganic material, an amorphous silicon, and an impurity amorphous silicon; forming source and drain electrodes and data electrodes by patterning a metal; forming a gate insulator and semiconductor layers having holes by etching the inorganic material and amorphous silicon with masks of source and drain electrodes and the metal; forming an ohmic contact layer by etching the amorphous silicon; forming a passivation layer by patterning an organic material or an inorganic material; depositing a transparent metal layer such as ITO for a storage capacitor on the gate insulator, the semiconductor layers, and the metal lines; depositing the first alignment layer; and forming the liquid crystal layer between the first and second substrates.

According to another aspect of the present invention, after depositing the gate insulator, the semiconductor and ohmic contact layer are patterned and the source and drain electrodes are formed. The ohmic contact layer is further etched, preferably by dry etching using the source and drain electrodes as a mask. Subsequently, the passivation layer is deposited. Further, after forming the holes by etching the passivation layer and gate insulator at the same time, transparent connecting parts for connecting to an outer driving circuit and transparent common electrodes are formed on the holes.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1A:
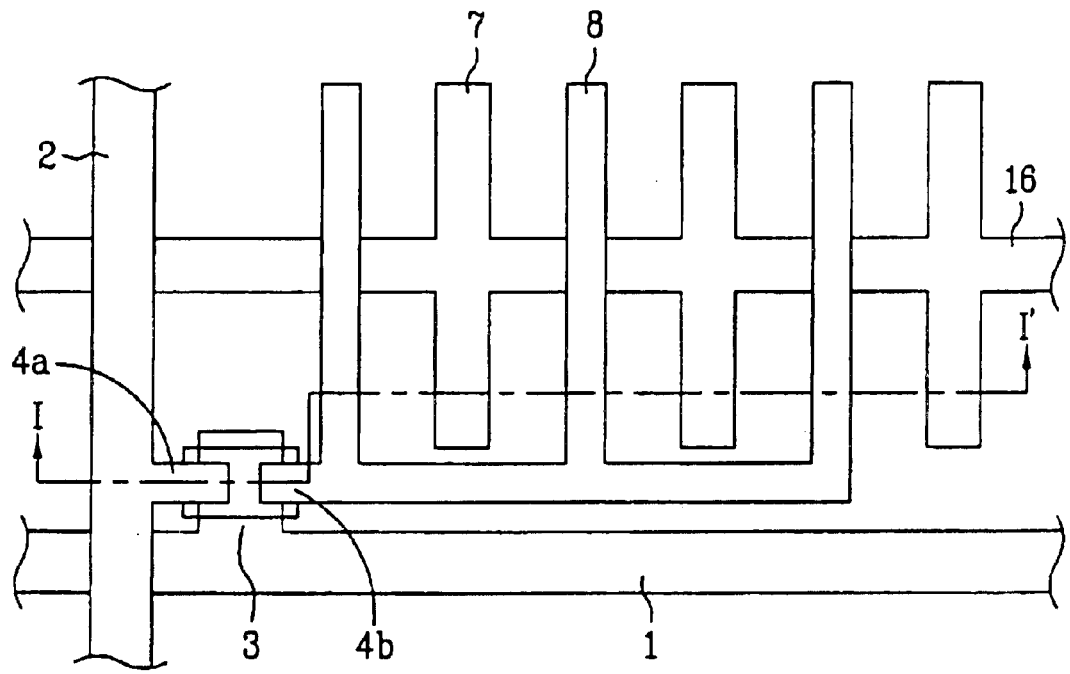
FIG. 1A is a plan view of a unit pixel of a conventional in-plane switching mode active matrix LCD.
Figure 1B:
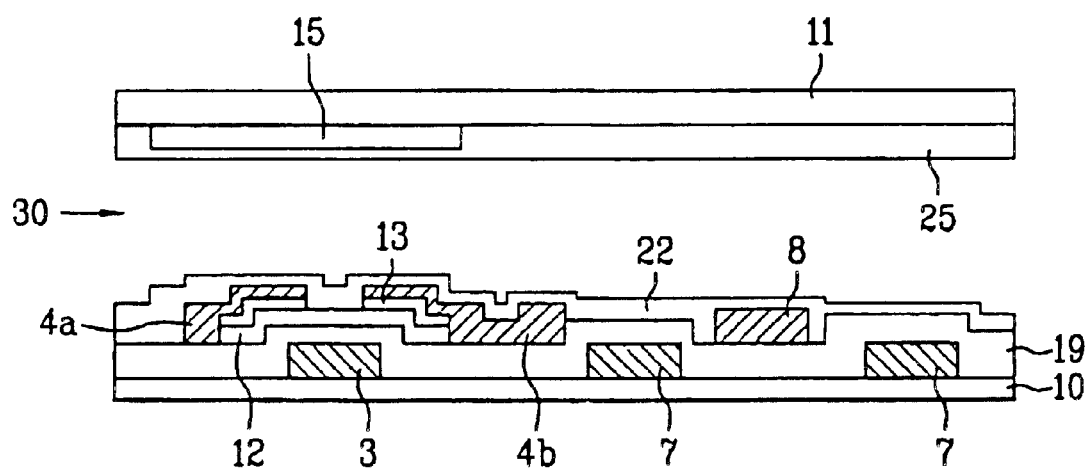
FIG. 1B is a sectional view according to line I—I of FIG. 1A.
Figure 2A:
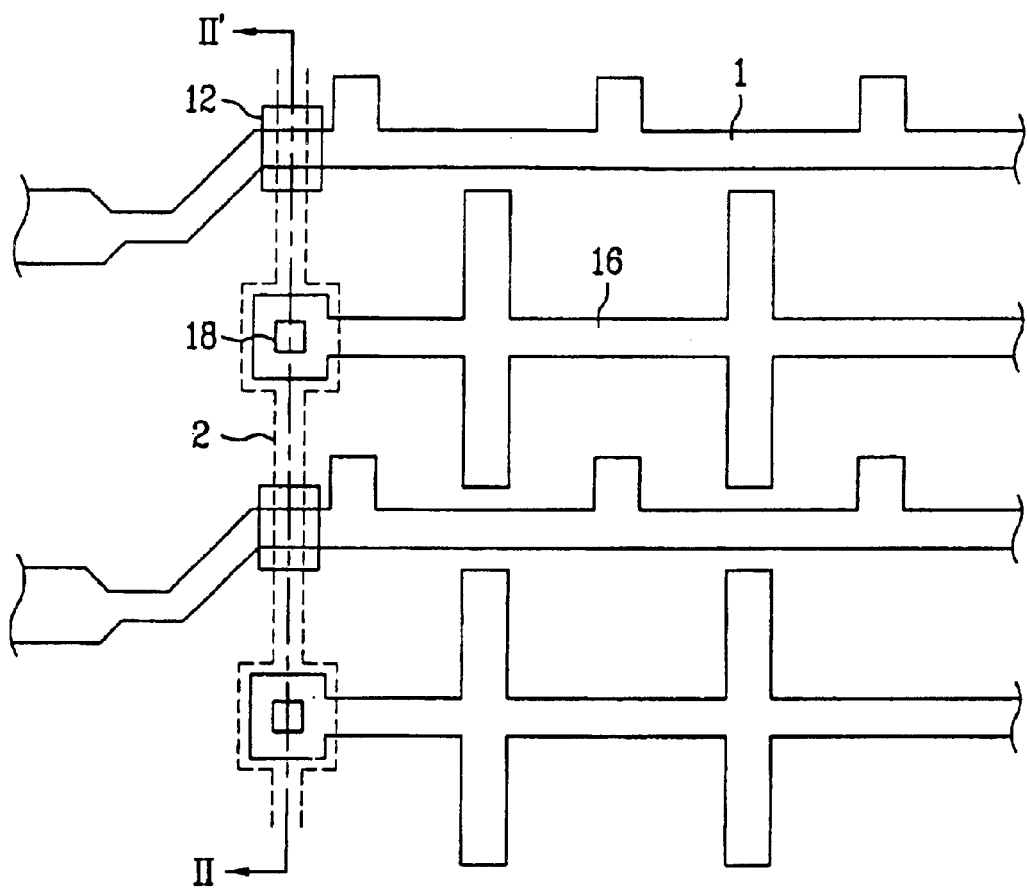
FIG. 2A is a plan view of the part forming the storage capacitor line of the conventional LCD.
Figure 2B:
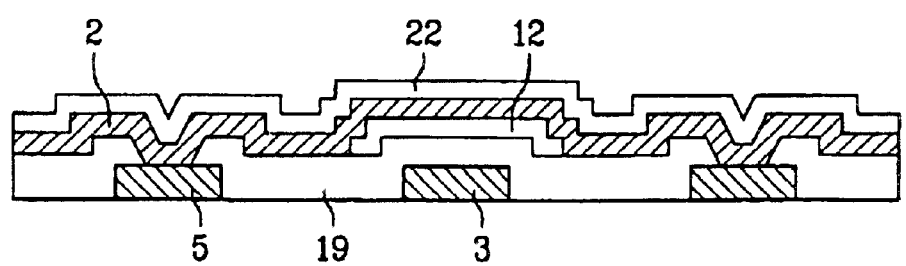
FIG. 2B is a sectional view according to line II–II' of FIG. 2A.
Figure 3:
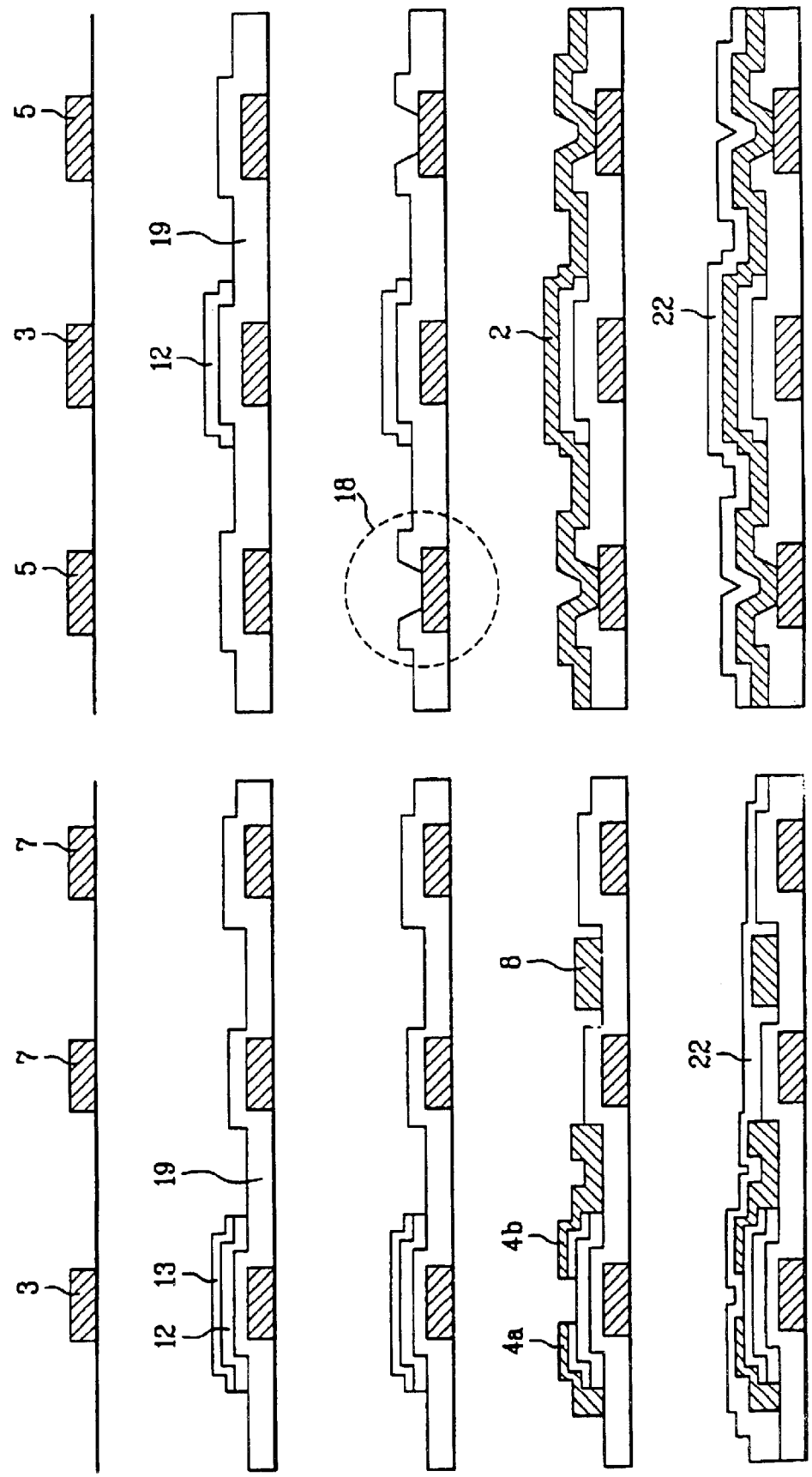
FIG. 3 is a drawing showing a method for manufacturing the conventional LCD.
Figure 4A:
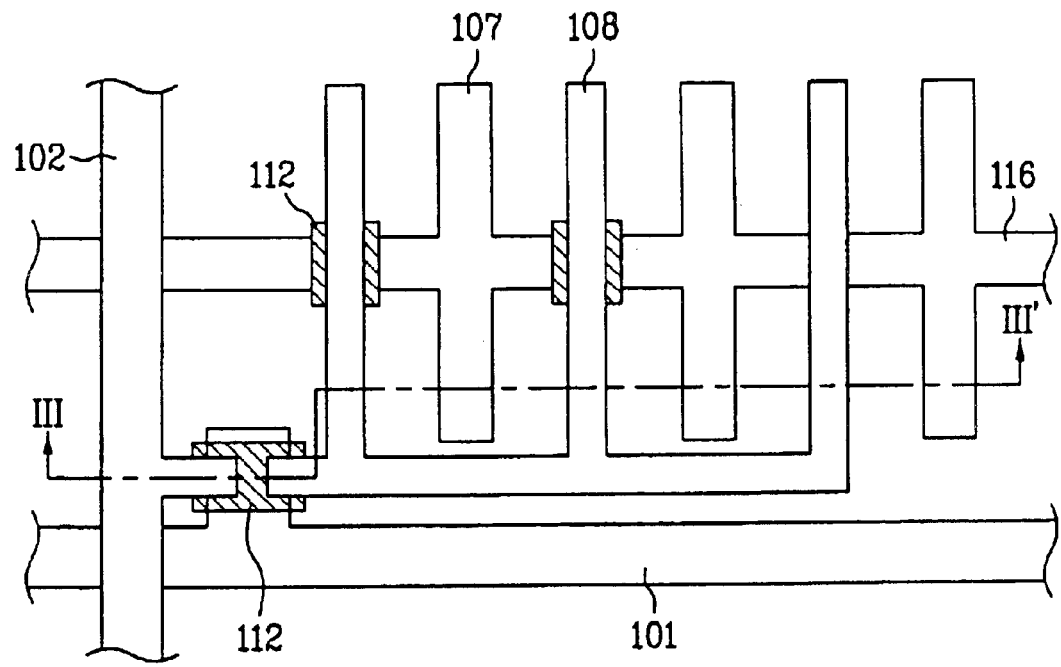
FIG. 4A is a plan view of a unit pixel of a hybrid active matrix LCD according to the present invention.
Figure 4B:
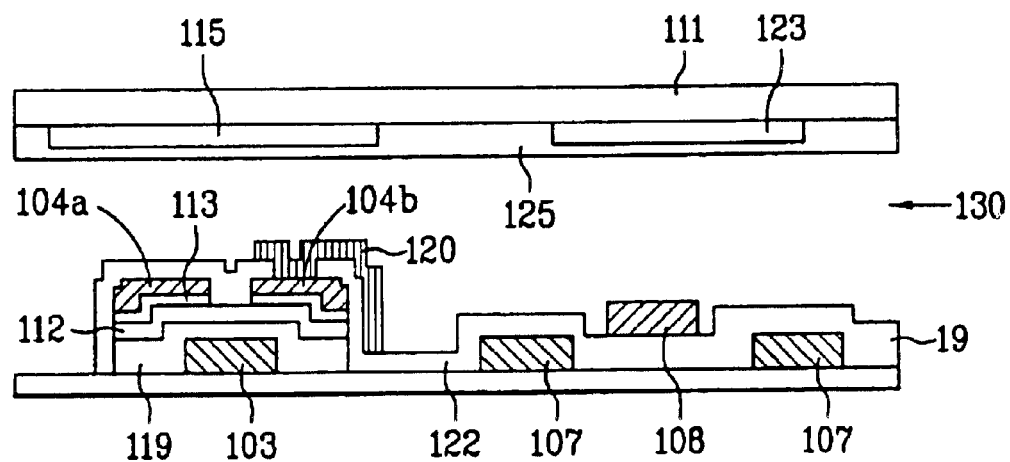
FIG. 4B is a sectional view according to line III–III' of FIG. 4A.

FIG. 4A is a plan view of a unit pixel of a hybrid active matrix LCD according to the present invention. FIG. 4B is a sectional view according to line III—III of FIG. 4A. As shown in the drawings, a gate bus line 101 and a transparent data bus line 102 defining a pixel region are arranged perpendicularly and/or horizontally in a matrix shape on the first substrate 110. Common line 116 is formed parallel to the gate bus line 101. A TFT is formed at a crossing of the data bus line 102 and the gate bus line 101 in the pixel region. A gate electrode 103 of the TFT is coupled to the gate bus line 101, and a source electrode 104a is coupled to the data bus line 102. In the pixel region, a common electrode 107 and a data electrode 108 are formed parallel to each other. The common electrode 107 is coupled to the common line 116 and the data electrode 108 is coupled to a drain electrode 104b through a transparent metal layer 120.

Although not shown in the drawing, it is possible that the two electrodes 107, 108 are formed on a single layer. Namely, the two electrodes 107, 108 may be formed on the gate insulator 119 on the first substrate 110. The common line 116 and the common electrode 107 are formed on the gate insulator 119 or a passivation layer 122 through holes thereon.

A semiconductor layer 112 is formed to prevent a short which is generated between the common line 116 and the data electrode 108 and at a cross point of the gate bus line 101 and the data bus line 102. In addition, a first alignment layer (not illustrated) is formed on the passivation layer 122.

Figure 5A:
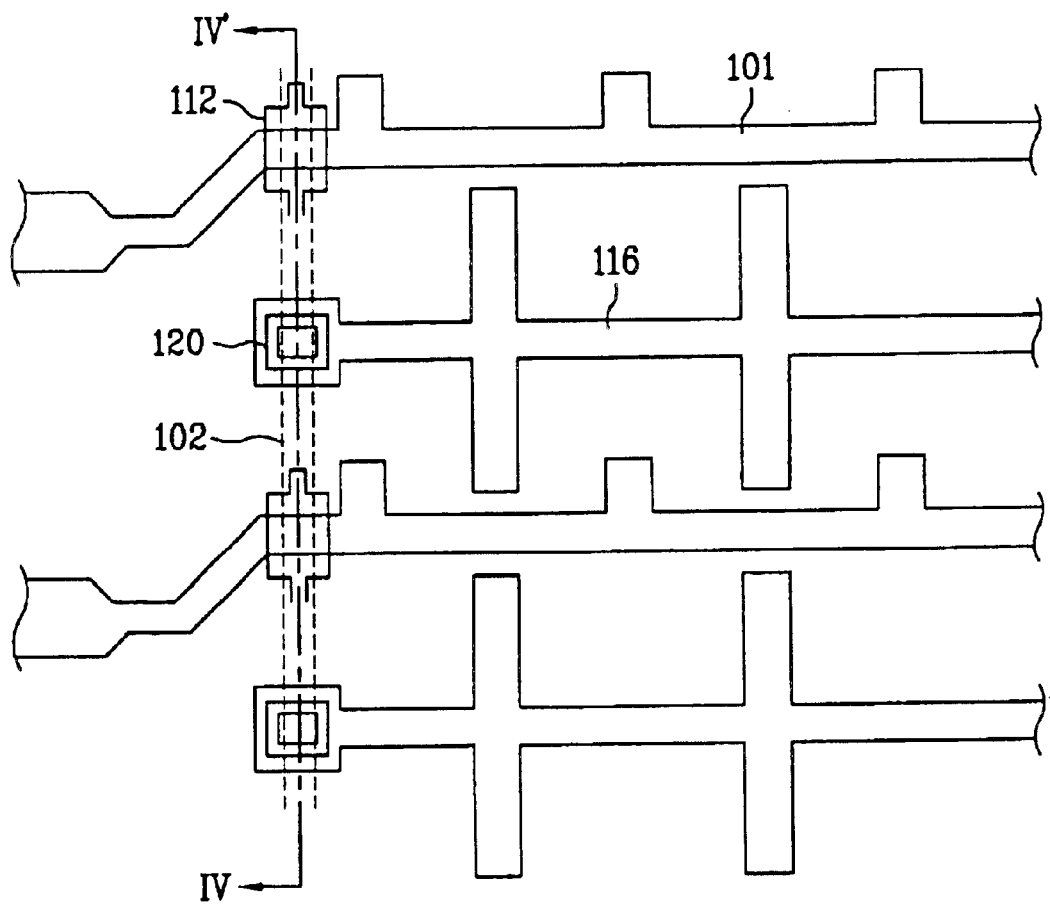
FIG. 5A is a plan view of the part forming the storage capacitor line of the present invention.
Figure 5B:
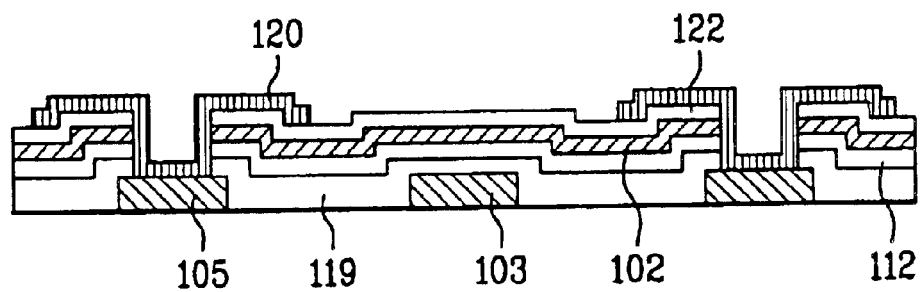
FIG. 5B is a sectional view according to line IV–IV' of FIG. 5A.
Figure 5C:
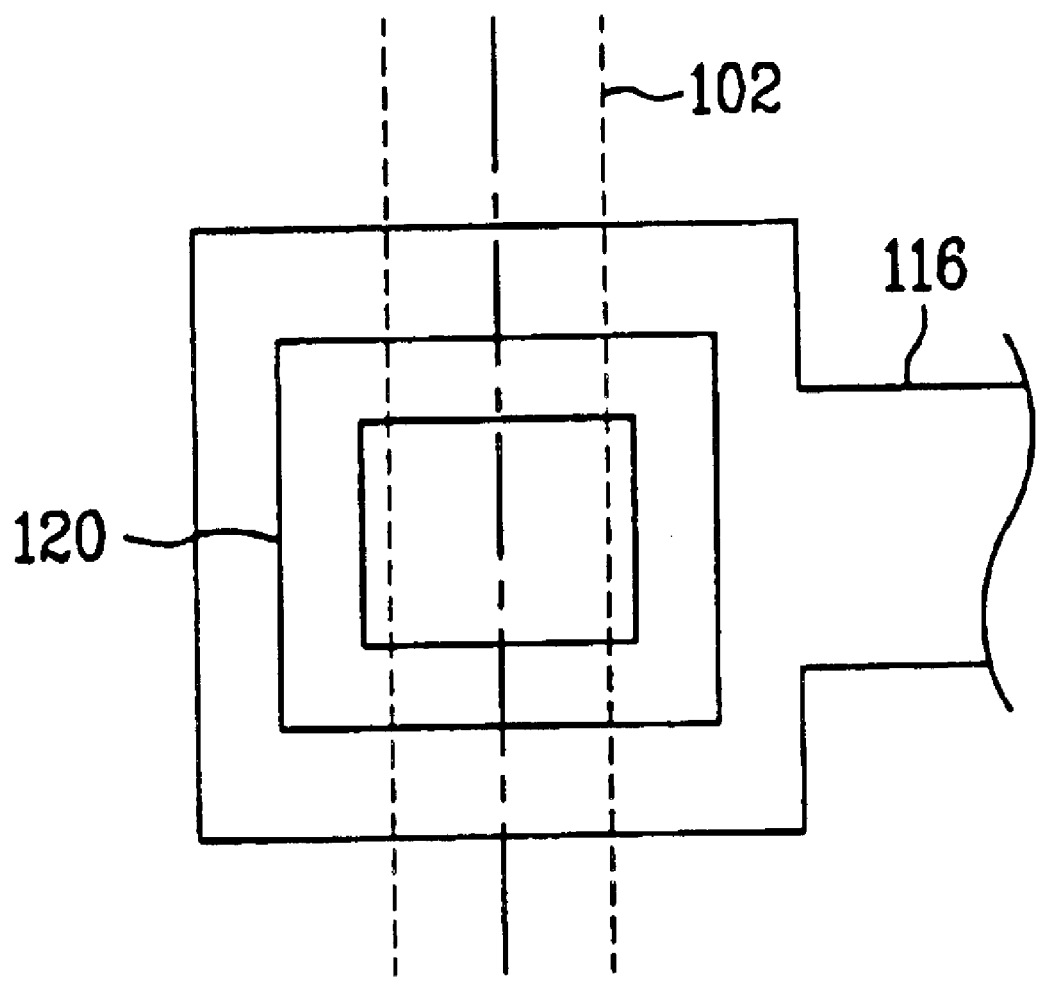
FIG. 5C is a partial plan view of FIG. 5A.

FIG. 5A is a plan view of the part forming the storage capacitor line of FIG. 4A. FIG. 5B is a sectional view according to line IV–IV' of FIG. 5A. FIG. 5C is a partial plan view of FIG. 5A. Referring to the drawings, the gate insulator 119, the semiconductor layer 112, and the data bus line 102 are deposited on the gate electrode 103 and a storage capacitor line 105. At this time, the data bus line 102 is formed with source and drain electrodes 4a and 4b of FIG. 4A and the passivation layer 122 is formed thereon. In addition, on the data bus line 102, the transparent conductive layer 120 connecting the data bus line 102 to the storage capacitor line 105 is formed on the data bus line 102. The passivation layer 122 may be formed on the TFT region only to achieve a strong electric field.

Figure 6:
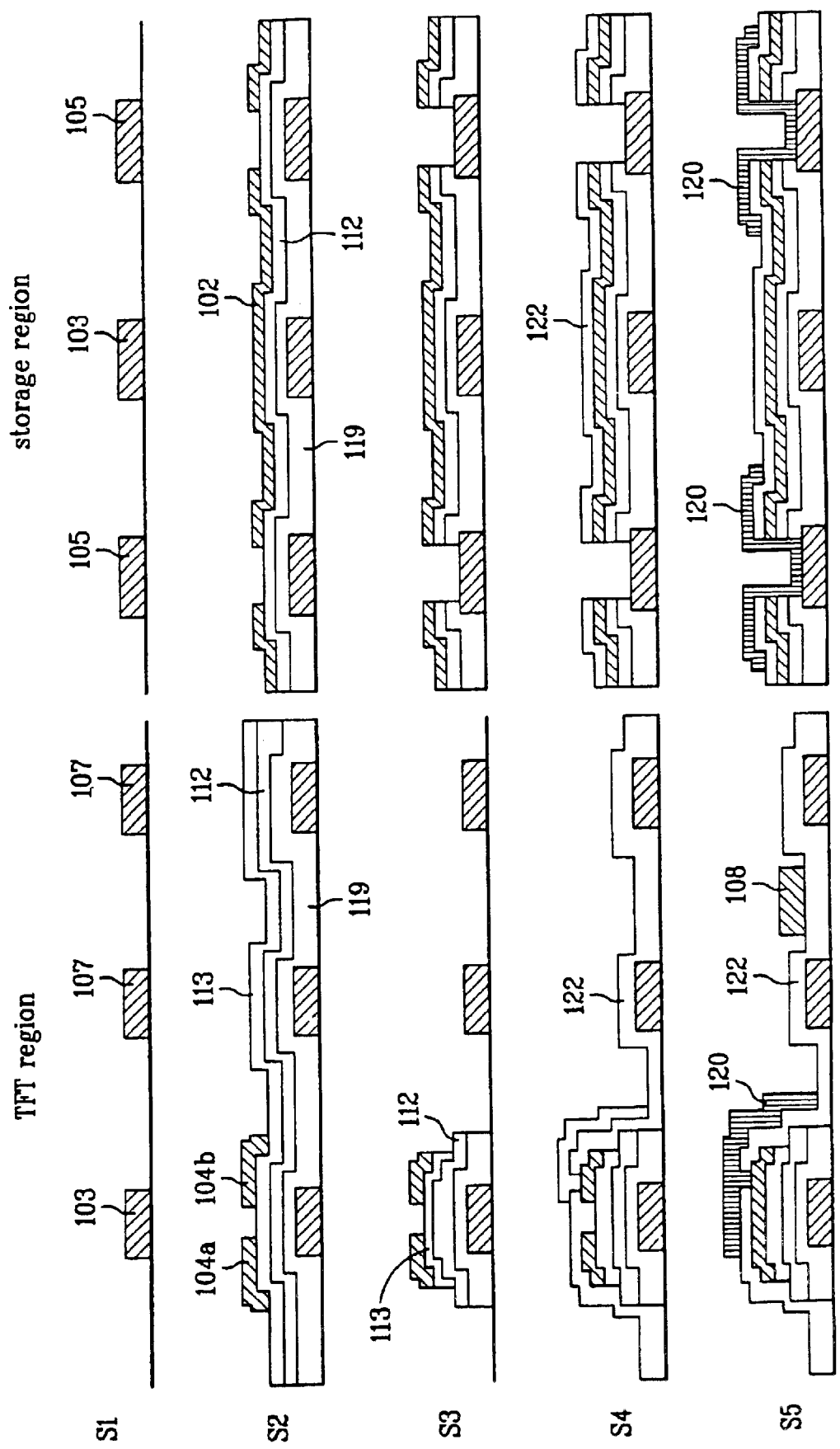
FIG. 6 is a drawing showing a method according to a first embodiment of the present invention.

FIG. 6 is a figure showing a method according to a first embodiment of the present invention. Referring to the drawing, the TFT region corresponds to a sectional region according to line III–III' of FIG. 4A, and the storage region corresponds to a sectional region according to line IV–IV' of FIG. 5A. As shown in the drawing, first, the gate electrode 103, the common electrode 107, and the storage capacitor line 105 are formed by depositing and etching a metal such as Ta, Al, Cr, Mo, or Al alloy using a sputtering method (S1). Although not shown in the drawing, the gate bus line and the common line are formed at the same time. At this time, it is possible to form an anodic oxidation layer by anodizing the gate electrode 103 and the common electrode 107 to improve the insulating characteristic.

The source and drain electrodes 104a and 104b are formed after depositing an inorganic material such as SiNx or SiOx, an amorphous silicon, and an impurity doped amorphous silicon by the PCVD (plasma chemical vapor deposition) method, and patterning the data bus line 102 in order to have holes (S2). The gate insulator 119, the amorphous silicon and the impurity doped amorphous silicon layer 113 are patterned using the data bus line 102 and the source and drain electrodes 104a and 104b, as a mask (S3). The impurity doped amorphous silicon layer is etched using the source and drain electrode as the mask. After the passivation layer 122 is formed by depositing and etching an inorganic material such as SiNx or SiOx, or an organic material such as BCB (benzocyclobutene) (S4), the storage capacitor line 105 and the data bus line 102 are coupled to each other electrically by depositing a transparent conductive 120 such as ITO in the holes of the gate insulator 119, the semiconductor layer 112, the data bus line 102 (S5). Furthermore, an etch stopper may be formed on the semiconductor layer 112 to prevent the channel region from being etched. The first alignment layer (not illustrated) is formed on the passivation layer 122.

A liquid crystal layer is formed between the first and second substrates.

Each alignment direction of the first and second alignment layers is determined by a rubbing method using polyamide, polyimide, SiO2, PVA (polyvinylalcohol) or polyamic acid, or by a photo-alignment method using photosensitive material such as PVCN (polyvinylcinnamate), PSCN (polysiloxanecinnamate) or CeICN (cellulosecinnamate).

Figure 7:
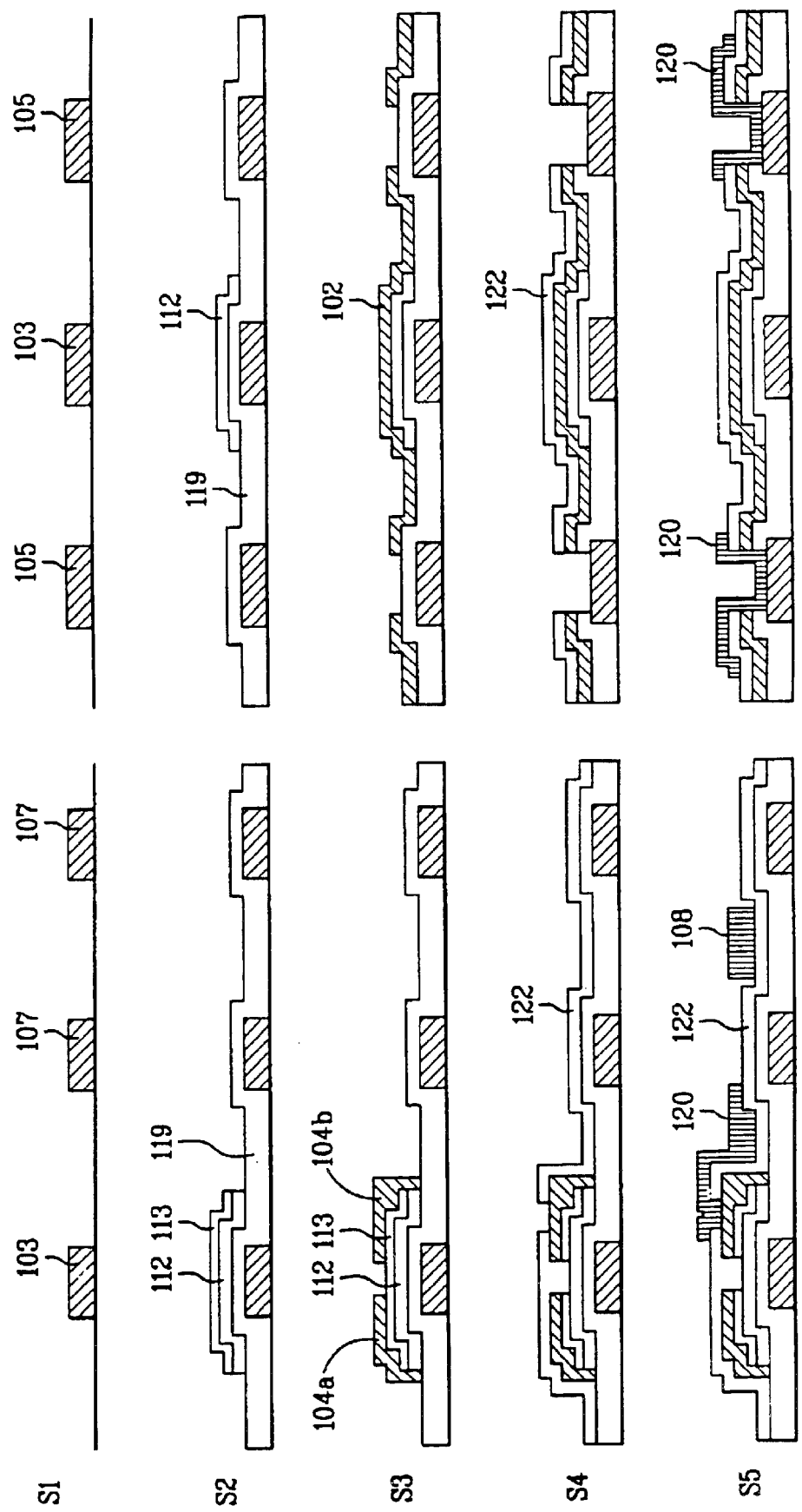
FIG. 7 is a drawing showing a method according to a second embodiment of the present invention.

FIG. 7 is a drawing showing a method according to a second embodiment of the present invention. The difference between the first embodiment and the second embodiment is that the gate insulator is formed on the entire surface of the first substrate and the semiconductor layer is patterned selectively.

Referring to FIG. 7, a TFT region corresponds to a sectional region according to line III–III' of FIG. 4A, and a storage region corresponds to a sectional region according to line IV–IV' of FIG. 5A.

As shown in the drawings, first, the gate electrode 103, the common electrode 107, and the storage capacitor line 105 are formed by depositing and etching a metal such as Ta, Al, Cr, Mo, or Al alloy using a sputtering method (S1). Although not shown in the drawing, the gate bus line and the common line are formed at the same time. At this time, it is possible to form an anodic oxidation layer by anodizing the gate electrode 103 and the common electrode 107 to improve the insulating characteristic.

The gate insulator 119 is formed on the entire surface of the first substrate 110 by depositing an inorganic material such as SiNx or SiOx, and the semiconductor layer 112 and the ohmic contact layer 113 are formed by depositing and patterning an amorphous silicon, and an impurity doped amorphous silicon by the PCVD (plasma chemical vapor deposition) method (S2).

The source and drain electrodes 104a and 104b and the data bus line 102 are patterned (S3). The impurity doped amorphous silicon 113 is etched, preferably by dry etching, using the source and drain electrodes as a mask. The passivation layer 122 is formed continually by depositing and etching an inorganic material such as SiNx or SiOx, or an organic material such as BCB (benzocyclobutene) (S4).

After forming the passivation layer 122, the storage capacitor line 105 and the data bus line 102 are coupled to each other electrically by depositing a transparent conductive 120 such as ITO in the holes of the gate insulator 119, the semiconductor layer 112, the data bus line 102 and the passivation layer 122 (S5). Here, some part of the passivation layer 122 and the gate insulator 119 on the storage region are etched at the same time. A data electrode is formed on the passivation layer 122.

According to the present invention, it is possible to obtain a hybrid LCD having a high opening ratio due to transparent connecting parts for connecting to an outer driving circuit by etching a passivation layer and gate insulator at the same time thereby forming a storage capacitor line.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A switching mode liquid crystal display device comprising:

first and second substrates;

a plurality of gate and transparent data bus lines defining pixel regions and arranged perpendicularly and/or horizontally on said first substrate;

a common line parallel to said gate bus line;

a plurality of thin film transistors formed on cross points of said gate and data bus lines;

at least one pair of common electrode and transparent data electrode;

a plurality of storage capacitor lines on a plane of said common electrode;

a passivation layer on said first substrate;

a transparent conductive layer for connecting said data bus lines to said storage capacitor lines;

a liquid crystal layer between said first substrate and said second substrate; and an alignment layer on said substrates.

2. A liquid crystal display device comprising:

a substrate;

a plurality of gate bus lines and data bus lines on the substrate;

a common line parallel to said plurality of gate bus lines;

a plurality of thin film transistors adjacent a crossing area of said plurality of gate bus lines and data bus lines, respectively;

at least one pair of electrodes including a common electrode and a transparent data electrode;

a plurality of storage capacitor lines on a plane of said common electrode;

a passivation layer on the substrate;

a transparent conductive layer connecting said plurality of data bus lines to said plurality of storage capacitor lines;

a liquid crystal layer between said first and second substrates; and an alignment layer on at least one of said first and second substrates.

3. The liquid crystal display device according to claim 2, wherein each of said thin film transistors includes a gate electrode connected to said plurality of gate bus lines, and, a gate insulator having a contact hole over said gate electrode, a semiconductor layer having a contact hole over said gate insulator, an ohmic contact layer over said semiconductor layer, and source and drain electrodes over said ohmic contact layer.

4. The liquid crystal display device according to claim 2, wherein said transparent conductive layer includes indium tin oxide.

5. A method of manufacturing a liquid crystal display device, the method comprising:
   providing a substrate;
   forming a gate bus line, a gate electrode, a common line, a common electrode, and a storage capacitor line by depositing and etching a metal;
   continually depositing layers of an inorganic material, amorphous silicon, and impurity doped amorphous silicon;
   forming source and drain electrodes over said continually deposited layers;
   forming a gate insulator and a semiconductor layer having holes by etching said inorganic material and amorphous silicon with masks of said source and drain electrodes and said metal;
   forming an ohmic contact layer by etching said impurity doped amorphous silicon;
   forming a passivation layer by patterning an organic material or an inorganic material;
   forming a transparent conductive layer over said gate insulator, said semiconductor layer, and said metal;
   forming a data electrode over the passivation layer;
   providing a liquid crystal layer on the substrate; and
   forming a first alignment layer on the substrate.

6. The method according to claim 5, wherein said transparent conductive layer includes indium tin oxide.

7. The method according to claim 5, wherein said metal including one of Ta, Al, Cr, Mo, and Al alloy.

8. A method of manufacturing a liquid crystal display device, the method comprising:
   providing a substrate;
   forming a gate bus line, a gate electrode, a common line, a common electrode, and a storage capacitor line by depositing and etching a metal;
   continually depositing layers of an inorganic material, amorphous silicon, and impurity doped amorphous silicon;
   forming a semiconductor layer and an ohmic contact layer by etching said amorphous silicon and impurity doped amorphous silicon;
   forming source and drain electrodes over said continually deposited layers;
   forming a passivation layer over the substrate;
   forming a transparent data electrode over said passivation layer;
   forming a data electrode over the passivation layer; providing a liquid crystal layer on the substrate; and
   forming a first alignment layer on the substrate.

9. The method according to claim 8, wherein forming a passivation layer includes depositing and etching an organic material or an inorganic material.

10. The method according to claim 8, wherein said transparent data electrode includes indium tin oxide.

11. The method according to claim 8, wherein said metal is selected from one of Ta, Al, Cr, Mo, and Al alloy.

12. A liquid crystal display device, comprising:
   a thin film transistor region including a gate electrode and a common electrode;
   a storage region including a gate electrode and a storage capacitor line;
   a gate insulator on the thin film transistor region and the storage region;
   an amorphous silicon layer over the gate insulator;
   an impurity doped amorphous silicon layer over the amorphous silicon layer:
   source and drain electrodes and a data bus line over the impurity doped amorphous silicon layer;
   a plurality of holes in the gate insulator, the amorphous silicon layer, the impurity doped amorphous silicon layer, and the data bus line;
   a passivation layer over the source and drain electrodes, and the data bus line; and
   a transparent conductive layer in the plurality of holes connecting the storage capacitor line and the data bus line.

13. The liquid crystal display device according to claim 12, wherein said transparent conductive layer includes indium tin oxide.

14. A method of manufacturing a liquid crystal display device, comprising:
   forming a thin film transistor region including a gate electrode and a common electrode by depositing and etching a first metal;
   forming a storage region including a gate electrode and a storage capacitor line by depositing and etching a second metal;
   continually depositing layers of an inorganic material, amorphous silicon, and impurity doped amorphous silicon;
   forming source and drain electrodes and a data bus line over the continually deposited layers;
   forming a plurality of holes by patterning using the data bus line and the source and drain electrodes as a mask;
   forming a passivation layer by depositing and etching one of an inorganic and an organic material; and
   depositing a transparent conductive layer in the plurality of holes connecting the storage capacitor line and the data bus line.

15. The method according to claim 14, wherein said transparent conductive layer includes indium tin oxide.

16. The method according to claim 14, wherein said first metal and said second metal are selected from Ta, Al, Cr, Mo, and Al alloy.

17. A liquid crystal display device, comprising:
   a thin film transistor region including a gate electrode and a common electrode;
   a storage region including a gate electrode and a storage capacitor line:
   a gate insulator on the entire surface of the thin film transistor region and the storage region;
   an amorphous silicon layer over the gate insulator;
   an impurity doped amorphous silicon layer over the amorphous silicon layer;
   source and drain electrodes and a data bus line over the gate insulator, the amorphous silicon layer, and the impurity doped amorphous silicon layer;
   a plurality of holes in the gate insulator, the amorphous silicon layer, the impurity doped amorphous silicon layer, and the data bus line;

a passivation layer over the source and drain electrodes, and the data bus line; and a transparent conductive layer in the plurality of holes connecting the storage capacitor line and the data bus line.

18. The liquid crystal display device according to claim 17, wherein said transparent conductive layer includes indium tin oxide.

19. The method of manufacturing a liquid crystal display device, comprising:

forming a thin film transistor region including a gate electrode and a common electrode by depositing and etching a first metal;

forming a storage region including a gate electrode and a storage capacitor line by depositing and etching a second metal;

depositing and selectively patterning an inorganic material on an entire surface of the thin film region and the storage region;

depositing and patterning amorphous silicon and impurity doped amorphous silicon;

forming source and drain electrodes and a data bus line over the inorganic material, the amorphous silicon, and the impurity doped amorphous silicon;

forming a plurality of holes by etching the impurity doped amorphous silicon using the source and drain electrodes as a mask;

forming a passivation layer by depositing and etching one of an inorganic and an organic material; and depositing a transparent conductive layer in the plurality of holes connecting the storage capacitor line and the data bus line.

20. The method according to claim 19, wherein said transparent conductive layer includes indium tin oxide.

21. The method according to claim 19, wherein said first metal and said second metal are selected from Ta, Al, Cr, Mo, and Al alloy.

* * * * *